United States Patent [19]

Segal

[11] 4,201,855

[45] May 6, 1980

[54] NOVEL POLYESTERS AND PREPARATION THEREOF BY INTERFACIAL CONDENSATION OF BIFUNCTIONAL ACID HALIDES OR ANHYDRIDES WITH BISPHENOLS

[75] Inventor: Leon Segal, Randolph, N.J.

[73] Assignee: Allied Chemical Corporation, Morris Township, Morris County, N.J.

[21] Appl. No.: 807,755

[22] Filed: Jun. 17, 1977

[51] Int. Cl.$^2$ ............................................. C08G 63/18
[52] U.S. Cl. .................................... 528/125; 528/126; 528/173; 528/176; 528/179; 528/182; 528/191; 528/192; 528/193; 528/194; 252/182
[58] Field of Search ............ 260/47 C, 47 CZ, 47 CP; 528/179, 182, 125, 126, 176, 194, 193, 173, 191, 192; 252/182

[56] References Cited

U.S. PATENT DOCUMENTS

| | | | |
|---|---|---|---|
| 3,351,611 | 11/1967 | Conix | 260/47 |
| 3,351,624 | 11/1967 | Conix | 260/47 |
| 3,398,120 | 8/1968 | Hindersinn et al. | 260/47 |
| 3,471,441 | 10/1969 | Hindersinn | 260/47 |

*Primary Examiner*—Lester L. Lee
*Attorney, Agent, or Firm*—Gerhard Fuchs; Horst M. Kasper

[57] ABSTRACT

Novel copolyesters are prepared by the interfacial condensation of bifunctional acid halides or anhydrides with bisphenols dissolved in mixtures of alkaline materials and liquid polyhydroxy hydrocarbons, ethers or amines. The copolyesters form useful fibers and plastic materials.

24 Claims, No Drawings

NOVEL POLYESTERS AND PREPARATION THEREOF BY INTERFACIAL CONDENSATION OF BIFUNCTIONAL ACID HALIDES OR ANHYDRIDES WITH BISPHENOLS

BACKGROUND OF THE INVENTION

1. Field of the Invention

This invention relates to the production of novel polyesters by the interfacial condensation of bifunctional acid halides or anhydrides with bisphenols dissolved in mixtures of alkaline hydroxides and liquid polyhydroxy hydrocarbons, ethers or amines.

2. Description of the Prior Art

Polyesters have found wide application for the production of fibers and plastic materials. Due to their technical importance, investigations are continuing for improved and more useful polyesters. Polyesters are prepared by the condensation of acid derivatives with alcohols. A high degree of polymerization has to be achieved for obtaining a useful material. To accomplish this, the alcohol and the acid molecule each has to have at least two functional groups. When the acid and the alcohol are bi-functional, then long chains can be obtained. If either component has more than two functional groups, branching or crosslinking occurs and three-dimensional networks are obtained.

Investigations on polyesters have previously been carried out wherein e.g. phthalic acid, isophthalic acid, terephthalic acid and 4,4'-benzophenone dicarboxylic acid were employed as the acid derivatives and aliphatic alcohols and phenolic compounds as the alcohols. Bisphenol-A, which is 2,2-bis[4-hydroxy-phenyl]-propane, has been of special interest as the alcohol since it can be readily prepared from acetone and phenol.

Polyesters have been modified in order to tailor specific properties for new applications. One way of modifying the properties of polyesters is to prepare copolyesters from at least two acid derivatives and/or at least two alcohols. However, it has been difficult to obtain useful copolyesters because when two or more acid derivatives or two or more alcohols are employed they have different reaction rates with the other components and generally will not produce the desired type of copolyester.

Conix in U.S. Pat. No. 3,028,364, issued Apr. 3, 1962, discloses the preparation of polyesters by condensing bisphenols with dicarboxylic acid chlorides in a two phase mixture of two liquids, the dicarboxylic acid chloride being dissolved in an organic liquid which is a solvent for the reaction product formed and the bisphenol being dissolved in a second liquid such as aqueous sodium hydroxide, which is immiscible with the first liquid. Conix discloses further that polyesters may be obtained by reacting a mixture of two or more specified bisphenols with one or more specified aromatic dicarboxylic acid chlorides or mixtures of two or more of the acid chlorides with one or more of the bisphenols.

Eareckson in Journal of Polymer Science, Volume 48, 339 (1959) discloses the polycondensation of bisphenol with acid chlorides.

SUMMARY OF THE INVENTION

The present invention provides novel polyesters prepared by condensing a halide or anhydride of an aromatic dicarboxylic acid dissolved in an alkyl halide and/or aromatic hydrocarbon with a bisphenol dissolved in a mixture of an alkaline metal hydroxide and a relatively non-reactive liquid polyhydroxy derivative of an aliphatic hydrocarbon, either or amine, preferably having two to six carbon atoms. The bisphenol solution is preferably diluted with water prior to reaction with the aromatic dicarboxylic acid halide or anhydride in order to further minimize copolymerization with the aliphatic hydrocarbon, ether or amine.

Novel copolyesters are provided which comprise an alternate sequence of a bisphenol oligomer having terminal phenolic hydroxy groups and an aromatic dicarboxylic acid.

In particular, the bisphenol oligomer can be [bisphenol-A]$_{n+1}$ [terephthalic acid]$_n$ ester wherein n is an integer of 1 to 20 and the aromatic dicarboxylic acid can be 4,4'-benzophenone dicarboxylic acid.

Novel copolyesters are also produced which comprise condensates having an alternate sequence of a mixture of bisphenols, at least one of which is substantially insoluble in aqueous alkali metal hydroxide, and an aromatic dicarboxylic acid.

Further, novel copolyesters are provided which comprise bisphenol A and various sequences, in particular random sequences, of terephthalic acid and 4,4'-benzophenone dicarboxylic acid.

The polyesters of the present invention are useful as fibers and plastics.

DETAILED DESCRIPTION OF THE INVENTION

Bisphenols useful in the present invention include but are not limited to hydroquinone, resorcinol, pyrocatechol, 2,2'-(4,4'-dihydroxydiphenyl)propane (bisphenol-A), 4,4'-dihydroxy diphenyl, 2,2'-dihydroxydiphenol, 2,4'-dihydroxydiphenyl, 1,4-dihydroxynaphthalene, 1,6-dihydroxynaphthalene, 2,6-dihydroxy-naphthalene, 1,2-dihydroxynaphthalene, 1,5-dihydroxynaphthalene, dihydroxyanthracene, 2,2'-dihydroxynaphthyl-1,1', o, m or p-hydroxybenzyl alcohol, 4,4'-dihydroxydiphenyl sulfone, 2,2-(4,4'-dihydroxy-3,3'-dimethyl-diphenyl)-propane, 2,2-(4,4'-dihydroxy-diphenyl) 1,1-dimethylpropane, 1,1-(4,4'-dihydroxy-diphenyl)propane, 1,1 or 2,2-(4,4'-dihydroxy-diphenyl)butane, 1,1 or 2,2 or 3,3'-(4,4'-dihydroxydiphenyl)pentane, 4,4'-dihydroxydiphenyl ether, 1-phenyl-1,1-(4,4'-dihydroxy-diphenyl)ethane, 1-phenyl-1,1-(4,4'-dihydroxydiphenyl)methane, 1,1-(4,4'-dihydroxydiphenyl)-cyclo-hexane, (4,4'-dihydroxydiphenyl)methane, 1,1-(4,4'-dihydroxy-3,3'-dimethyl diphenyl)cyclohexane, 1,1-(2,2'dihydroxy-4,4'-dimethyl-diphenyl)butane, 2,2'-(2,2'-dihydroxy-4,4'-di-tert-butyl-diphenyl)-propane, 2,2-(4,4'-dihydroxy-diphenyl)hexane, 3,3-(4,4'-dihydroxy-diphenyl)-hexane, 2,2-(4,4'-dihydroxydiphenyl)tridecane, 2,2-(4,4'-dihydroxy-3'-methyl-diphenyl)propane, 2,2-(4,4'-dihydroxy-3-methyl-3'-isopropyl-diphenyl)butane, 2,2-(3,5,3',5'-tetrachloro-4,4'-dihydroxy-diphenyl)propane, 2,2-(3,5,3',5'-tetrabromo-4,4'-dihydroxy-diphenyl)propane, (2,2'-dihydroxy-5,5'-difluoro-diphenyl)-methane, (2,2'-dihydroxy-5,5'-dichloro-diphenyl)methane, (2,2'-dihydroxy-3,5,6,3',5',6'-hexachloro-diphenyl)methane or mixtures thereof.

The bishenols useful in the present invention include bisphenols with one to five aromatic rings connected either straight or fused which may contain one or more heterocyclic substituents including nitrogen, oxygen and sulfur. The aromatic rings can contain inert substituents which do not interfere in the polymerization reaction and include $C_1$–$C_4$ alkyl, $C_1$–$C_4$ alkoxy, halogen, halogenated alkyl, aryl, arylalkyl and aryloxy.

Preferred bisphenols comprise an aromatic ring having two p-hydroxy groups, and include between about two and twenty aromatic rings connected in the para position directly or with one or two aliphatic carbon linkages and having terminal p-hydroxy groups. For economic reasons bisphenols with rings having terminal m-hydroxy groups may be employed solely or in combination with others. Typical examples of the preferred bisphenols are bisphenol-A, 4,4'-dihydroxydiphenyl, 2,2-(4,4'-dihydroxydiphenyl)butane, 2,2-(3,5,3',5'-tetrachloro-4,4'-dihydroxydiphenyl)propane.

In addition, oligomers of the bisphenols can be employed in the present invention. Such oligomers are prepared by condensation of the above-named bisphenols with dicarboxylic acid derivatives of acids such as carbonic acid, oxalic acid, malonic acid, maleic acid, fumaric acid, succinic acid, glutaric acid, adipic acid, pimelic acid, suberic acid, azelaic acid, sebacic acid, phthalic acid, isophthalic acid, terephthalic acid, quinolinic acid, acridinic acid, diphenic acid, dicarboxydiphenic acid, homophthalic acid, 4,4'-dicarboxy-(diphenyl ether) acid, 4,4'-dicarboxy(diphenyl sulfone) acid, 4,4'-dicarboxy(diphenyl methane) acid, 1,2- and 1,1-(4,4-dicarboxy diphenyl)-ethane acid, 4,4'-dicarboxy benzophenone acid, 2,4-dicarboxy benzophenone acid, 2,2-dicarboxy benzophenone acid, 4,4'-dicarboxydiphenyl)-propane acid, 2-2-(3,3'-dicarboxy-diphenyl)-propane acid, 2,2-(4,4'-dicarboxy-diphenyl)-1,1-dimethyl propane acid, 1,1 or 2,2-(4,4'-dicarboxydiphenyl)-butane acid, 1,1 or 2,2 or 3,3-(4,4'-dicarboxydiphenyl)hexane acid, phenylene diacetic acid, or mixtures thereof.

Preferred dicarboxylic acid derivatives include dicarboxylic acids derived from one to five aromatic rings connected either straight or fused which may contain one or more heterocyclic substituents including nitrogen, oxygen and sulfur. The aromatic rings can contain inert substituents which do not interfere in the polymerization reaction which include $C_1$–$C_4$ alkyl, $C_1$–$C_4$ alkoxy, halogen, halogenated alkyl, aryl, alkylaryl and oxyaryl.

Preferred dicarboxylic acid derivatives comprise an aromatic ring having two p-carboxyl groups, and include between about two and twenty aromatic rings connected in the para position directly or with one or two aliphatic carbon linkages and having terminal p-carboxyl groups. For economic reasons dicarboxylic acid derivatives with rings having terminal m-carboxyl groups may be employed solely or in combination with other. Typical examples of the preferred dicarboxylic acids are terephthalic acid, 4,4'-dicarboxydiphenyl acid, 4,4'-dicarboxy(diphenyl-methane) acid, 1,2(4,4'-dicarboxydiphenyl)ethane acid, 2,4'-benzo-phenone dicarboxylic acid.

Preferred oligomers include condensates of bisphenol-A and terephthalic acid and of bisphenol-A and 4,4'-benzophenone dicarboxylic acid.

The oligomers can be prepared by methods known in the art. 2,2-(4,4'-dihydroxy-di-phenyl)propane terephthalic acid ester oligomers are prepared by the process described in Prevorsek et al.'s copending U.S. patent application Ser. No. 764,623, filed Feb. 1, 1977. Such oligomers are produced by admixing terephthaloyl chloride with bisphenol-A in solution in a reaction medium of excess pyridine and chlorinated organic solvent such as dichloromethane or chlorobenzene at a volume ratio from 1:3 to 10:1 of chlorinated solvent to pyridine and by carrying out the reaction of terephthaloyl dichloride and bisphenol-A not above 35° C. The resulting oligomers having terminal phenolic hydroxy groups are either a specific oligomer or or a random mixture of oligomers with various chain lengths.

Specifically, prepartion of such oligomers can be outlined as follows:

Starting Materials ("BPA"=bisphenol-A; "TPC"-terephthaloyl dichloride); DCM=dichloromethane):
  4.08 mols (931.2 gm.) BPA/1200 ml. pyridine/6000 ml. DCM; filter
  1.92 mols (390.0 gm.) TPC/2500 ml. DCM; filter Addition: 16 hr. at room temperature, TPC solution to BPA solution under dry nitrogen and with vigorous stirring.

Work-up of low molecular weight polyester (BPA terephthalate):

1. Wash with 4% HCl (ag)=480 gm. and with water (4 times) to pH 4.5 and faint chloride ppt. with $AgNO_3$ in the wash water. Wash removes pyridine as its hydrochloride salt.
2. Evaporate organic phase to dryness.
3. Disperse solid residue in 10 parts of methanol and filter. Residue separated is mostly higher polyester oligomers than di(BPA) terephthalate, viz. tri(BPA)diterephthalate, i.e. $(BPA)_3(TP)_2$ and on up to above $(BPA)_8(TP)_7$, each higher ester being present in about one-half the molar proportion of the next lower.
4. To filtrate, add water until cloudy, then 10% more water. Filter. Filtrate is mostly BPA. Solid residue (analyzed as 0.1% solution in reagent grade chloroform by high pressure liquid phase absorption chromalography) is 94–95% by weight di(BPA)terephthalate, balance is BPA and oligomers higher than di(BPA)terephthalate.

The bisphenols of the present invention can be employed singly or in combination limited only by their capability of being dissolved in a suitable solvent as set forth in the following description. Bisphenols insoluble in aqueous alkali, but soluble in a solvent of the present invention are advantageously employed. Bisphenols which do not dissolve in alkali-water solutions are made accessible as starting materials in the present invention.

The bisphenol is dissolved in a mixture of an alkaline hydroxide and a relatively non-reactive liquid polyhydroxy derivative of an aliphatic hydrocarbon ether or amine, preferably having two to six carbon atoms. While it is desirable to dissolve all of the bisphenol, the reaction can also be carried out where part of the bisphenol is dispersed or suspended.

Alkaline hydroxides include materials which can generate in admixture to water a pH of at least ten. The preferred alkaline hydroxides comprise the alkali metal hydroxides. Sodium hydroxide is preferably used due to its efficiency and relatively low cost. The alkali metal hydroxide is preferably employed in a mole ratio of about 0.1 to 3 moles of hydroxide per mole of bisphenol.

The liquid polyhydroxy derivatives of aliphatic hydrocarbons, ethers and amines include compounds where the hydroxy groups are less active in a condensation reaction than those of the bisphenols employed in order to minimize copolyesterification of the solvent in the process. The polyhydroxy derivatives of aliphatic hydrocarbons, ethers and amines preferably containing two to six carbon atoms include but are not limited to glycol, propane diols, butane diols, pentane diols, glycerol, polyglycol ethers, diethane glycol and tri-ethanol amine. The preferred compounds are polyhydroxy alkanes and their ethers. Glycol is most preferred because of its relatively low cost.

The solution of the bisphenol in the mixture of the alkaline hydroxide and the polyhydroxy derivative of an aliphatic hydrocarbon, ether or amine is used directly in the condensation reaction or can be further modified. The solution is preferably modified by adding water in order to minimize copolycondensation of the polyhydroxy derivative and to decrease the miscibility of the two phases. Large amounts of water can be added without precipitating the dissolved bisphenol. The preferred ratio of water to concentrate solution lies between about 0.5-10:1 by volume. Furthermore, the water may be replaced in part, as up to about 50% by volume, by methanol and other solvents, such as dimethylketone, etc. However, the solvent replacing the water must be restricted to such materials which do not take part in the ester forming reaction.

It is preferred to stabilize the bisphenol solution against oxidation in the presence of air by adding a reducing agent to the solution. A suitable agent for this purpose is sodium dithionite. The amount of reducing agent added depends naturally on the conditions which the solution is subjected to In general, quite a small amount of reducing agent is sufficient and a ratio of between 1:100 to 1:10 of sodium dithionite relative to the weight of the bisphenol prevents oxidation satisfactorily. Other reducing agents besides sodium dithionite are useful, such as sulfites, for instance, sodium bisulfite.

Oxidation of the solution may be further prevented by using an inert gas blanket over the solution and by handling the reaction in an inert gas atmosphere. Gases useful to prevent oxidation include but are not limited to such gases as helium, argon, carbon dioxide, nitrogen, etc. Nitrogen gas is preferred from the standpoint of efficiency and economy.

Catalysts may be used to enhance the reaction speed of the polyester formation. Such catalysts, when employed are preferably added to the bisphenol solution. The catalysts include but are not limited to tetra alkyl ammonium halides and Duponol (trademark for a series of surface active agents based on layryl sulfate). A preferred catalyst is tetra ethyl ammonium chloride. The catalyst is introduced into the bisphenol solution and accelerates the reaction with the dicarboxylic acid halide or anhydride. The catalysts are added in sizeable amounts of preferably between about one-tenth and ten times the weight of the bisphenol. All the additional ingredients are mixed well with the solution of the bisphenol by vigorous agitation in conventional manner, e.g. by stirring or vessel rotation.

The bisphenol is reacted with an aromatic dicarboxylic acid halide or anhydride. Acid chlorides are preferred because of their reactivity and relatively low cost. Typical examples include the halides, preferably the chloride, and the anhydrides of 4,4'-benzophenone carboxylic acid, phthalic acid, isophthalic acid, terephthalic acid, quinolinic acid, acridinic acid, diphenic acid, (4,4'-dicarboxy-diphenyl) acid, homophthalic acid, 4,4'-dicarboxy(diphenyl ether) acid, 4,4'-dicarboxy(diphenyl sulfone) acid, 4,4'-dicarboxy(diphenyl methane) acid, 1,2- and 1,1-(4,4'-dicarboxy diphenyl)ethane acid, 2,4-dicarboxy benzophenone acid, 2,2-dicarboxy benzophenone acid, 4,4'-dicarboxy-diphenyl)-propane acid, 2,2-(3,3'-dicarboxy-diphenyl)propane acid, 2,2-(4,4'-dicarboxy-diphenyl)-1,1-dimethyl propane acid, 1,1 or 2,2-(4,4'-dicarboxy-diphenyl) butane acid, 1,1 or 2,2 or 3,3-(4,4'-dicarboxyphenyl)pentane acid, 1,1 or 2,2 or 3,3-(4,4'-dicarboxy-diphenyl)-hexane acid, phenylene diacetic acid, or mixtures thereof.

Preferred aromatic dicarboxylic acid halides and anhydrides include the dicarboxylic acid derivatives of one of five aromatic rings either straight or fused which may contain one or more heterocyclic substituents including nitrogen, oxygen and sulfur. The aromatic rings can contain inert substituents which do not interfere in the polymerization and include $C_1$-$C_4$ alkyl, $C_1$-$C_4$ alkoxy, halogen, halogenated alkyl, aryl, arylalkyl and aryloxy.

Preferred dicarboxylic acid derivatives include the acid chlorides of an aromatic ring having two p-carboxyl groups, or between about two and twenty aromatic rings connected in the paraposition directly or by one or two aliphatic carbon atoms and having terminal p-carboxyl groups such as terephthalic acid, diphenic acid, 4,4'-dicarboxy(diphenyl methane) acid, 1,2-(4,4'-dicarboxy diphenyl)ethane acid, 4,4'-benzophenone dicarboxylic acid. For economic reasons dicarboxylic acid derivatives with rings having m-carboxyl groups may be employed solely or in combination with others.

It is desirable to employ high purity aromatic dicarboxylic acids in order to obtain long chain polyesters and to avoid chain termination. The aromatic dicarboxylic acid derivatives can be purified in conventional manner, e.g. by distillation or recrystallization. 4,4'-benzophenone dicarboxylic acid chloride is preferably recrystallized. The aromatic dicarboxylic acid is employed at about a stoichiometric ratio relating to the bisphenol. It is preferable to use an excess of about between 10% and 20% over the stoichiometric amount corresponding to the bisphenol in order to obtain easily high molecular weights.

The halides or anhydrides of the dicarboxylic acids are dissolved in liquid alkyl halides and/or liquid aromatic hydrocarbons. The generally employed liquid alkyl halides include but are not limited to dichloromethane, dichloroethane, carbon tetrachloride, chloroform, tetrachloroethane. The liquid aromatic hydrocarbons include but are not limited to benzene and toluene. Furthermore, mixtures of such alkyl halides and/or aromatic hydrocarbons can be used. In particular circumstances, it is advantageous to have a solvent which refluxes at the reaction temperature of the interfacial of reaction. A suitable refluxing solvent is dichloromethane. The amount of solvent in ml is between about about ten and a hundred times the gram amount of aromatic dicarboxylic acid.

The bisphenol solution is interfacially reacted with the aromatic dicarboxylic acid solution. Strong agitation, as by stirring or vessel rotation, increase the reaction interfere between the two solutions. The reaction temperature for the interfacial reaction is not critical and can be within the range of about −20° C. and up to 80° C., a preferred temperature being between about 0° C. and 25° C. The interfacial reaction results in vary long chains at very high molecular weight polymers.

The polyesters are separated from the reaction mixture by conventional methods of separation, such as precipitation by addition of a non-solvent, such as acetone. The resulting polyesters possess excellent heat and solvent resistance and good processability. Depending on the procedural steps employed in the above reaction, one can obtain both block copolyesters and random copolyesters.

Copolyesters of bisphenol-A with terephthalic acid and 4,4'-benzophenone dicarboxylic acid are obtained by the above process or by dissolving bisphenol-A initially in a mixture of water and alkali metal hydroxide, preferably with a reducing agent like sodium dithionite and a catalyst such as tetraethyl ammonium chloride. In the latter process, terephthalic acid chloride and 4,4'-benzophenone dicarboxylic acid chloride are dissolved in an akyl halide and/or an aromatic hydrocarbon. The relative amount of terephthalic acid chloride to 4,4'-benzophenone dicarboxylic acid chloride is not critical for the polyesterification reaction, and generally a mole ratio of about between 0.1 to 10:1 of terephtalic acid chloride to 4,4'-benzophenone dicarboxylic acid chloride is employed. The two solutions are reacted under the conditions described above, and the resulting copolyester is separated from the reaction mixture, as by precipitation with a non-solvent followed by filtration.

The invention will be more fully understood and further advantages will be apparent when reference is made to the following detailed examples of the preferred embodiments of the invention.

EXAMPLE 1

Interfacial reaction of benzophenone dicarboxylic acid chloride with random oligomer of bisphenol-A, terephthalic acid oligo ester.

Under a nitrogen blanket, a solution of 480 milliters ethylene glycol with 8 grams sodium hydroxide was prepared. To this solution, 4.4 g of random bisphenol-A terephthalic acid oligo esters were added with stirring. The oligo esters were prepared by the method disclosed in the Prevorsek et al.'s copending U.S. patent application Ser. No. 76,623, filed Feb. 1, 1977. Furthermore, 0.8 gram of sodium dithionite was added to prevent oxidation. The resulting solution was filtered to remove insoluble material and then 2,300 milliliters of water were added to the solution. The solution was rapidly stirred and 11.2 grams of tetra ethyl ammonium chloride were added as a catalyst.

A second solution of 23 grams of 4,4'-benzophenone dicarboxylic acid chloride in 240 milliliters of dichloroethane was prepared. At room temperature, the second solution was then added to the first solution, which continued to be rapidly stirred under nitrogen gas. After termination of the polyester condensation reaction, the resulting copolyester of bisphenol-A terephthalic acid oligo ester and 4,4'-benzophenone dicarboxylic acid chloride was precipitated with acetone. The resulting copolyester was washed with water to remove water soluble impurities. The intrinsic viscosity of the copolyester was 0.54 deciliter per gram and the copolyester has a glass transition temperature of 178° C.

EXAMPLE 2

Interfacial reaction of 4,4'-benzophenone dicarboxylic acid chloride and [bisphenol-A]$_2$ [terephthalic acid] ester.

Under nitrogen, a solution of 480 mls. of ethylene glycol and 18 g. sodium hydroxide was prepared. 0.08 g. of sodium dithionite was added to the solution and then 4.4 g. of 96 weight % [bisphenol A]$_2$ [terephthalic acid] ester was introduced. With rapid stirring 12.4 g. of tetraethylammonium chloride were introduced. Then under heavy and vigorous stirring, a solution of 23 g. of 4,4'-benzophenone dicarboxylic acid chloride in 240 mls. of dichloroethane was added under nitrogen. After termination of the reaction, the resulting copolyester was precipitated with acetone and washed with water. The copolyester had an intrinsic viscosity of 0.64 dl/g and a glass transition temperature of 193° C.

EXAMPLE 3

Interfacial condensation of bisphenol A with a mixture of terephthalic acid chloride and 4,4'-benzophenone dicarboxylic chloride.

25.1 g. of bisphenol-A were dissolved in 675 mls. of water with addition of 9 g. of sodium hydroxide and approximately 0.06 g. of sodium dithionate under nitrogen. 13 g. of tetraethyl ammonium chloride was added to this solution with rapid stirring. To this solution was added a solution of 16.9 g. of 4,4'-benzophenone dicarboxylic acid chloride and 11.2 g. of terephthalic acid chloride in 350 mls. of dichloroethane with continued rapid stirring under a nitrogen blanket. After termination of the ensuing reaction, the product comprising a bisphenol-A (terephthalic acid, 4,4'-benzophenone dicarboxylic acid) copolyester was precipitated in acetone and washed with water. The copolyester had an intrinsic viscosity of 0.48 dl/g and a glass transition temperature of 178° C. Nuclear magnetic residence showed that the copolyester contained about 49 mole % of bisphenol-A component, about 23 mole % of terephthalic acid component and about 27 mole % of 4,4'-benzophenone dicarboxylic acid component.

Repetition of this example with recrystallized 4,4'-benzophenone dicarboxylic acid chloride and employing a 10% excess of aromatic dicarboxylic acid chloride over stoichiometric resulted in a copolyester having an intrinsic viscosity of 1.18 dl/g and a glass transition temperature of 222° C. Another run employing recrystallized 4,4'-benzophenone dicarboxylic acid chloride and a 10% excess of aromatic dicarboxylic acid over stoichiometric resulted in an intrinsic viscosity of 1.65 and a glass transition temperature of 229° C.

EXAMPLE 4

Interfacial reaction of bisphenol-A with mixtures of terephthalic acid chloride and 4,4'-benzophenone dicarboxylic acid chloride.

The conditions of Example 3 were repeated, however, the molar ratio of terephthalic acid and 4,4'-benzophenone dicarboxylic acid chloride was changed. In this example, 66.7 mole % of the diacid chloride consisted of terephthalic acid chloride and 33.3 mole % consisted of 4,4'-benzophenone dicarboxylic acid chloride. The resulting copolyester was found to have in one case an intrinsic viscosity 0.29 dl/g and a glass transition temperature of 110° C. Another run with recrystallized benzophenone dicarboxylic acid chloride and employing a 10% excess of aromatic dicarboxylic acid chloride over stoichiometric resulted in a copolyester having an intrinsic viscosity of 0.99 dl/g and a glass transition temperature of 205° C. A third run employing recrystallized 4,4'-benzophenone dicarboxylic acid chloride and a 10% excess of aromatic dicarboxylic acid over stoichiometric, produced a copolyester having an intrinsic viscosity of 1.42 dl/g and a glass transition temperature of 215° C.

EXAMPLE 5

Interfacial reaction of bisphenol-A and terephthalic acid chloride, 4,4'-benzophenone dicarboxylic acid chloride mixtures.

The conditions of Example 3 were repeated, however, the relative molar ratios of terephthalic acid chloride to 4,4'-benzophenone dicarboxylic acid chloride were 80 to 20. The resulting copolyester was found to have an intrinsic viscosity of 0.24 dl/g and a glass transition temperature of 174° C. A second run using recrystallized benzophenone dicarboxylic acid chloride and a 10% excess of aromatic dicarboxylic acid chloride over stoichiometric produced a copolyester having an intrinsic viscosity of 1.50 dl/g and a glass transition temperature of 225° C.

EXAMPLE 6

Interfacial reaction of bisphenol-A and terephthalic acid chloride, 4,4'-benzophenone dicarboxylic acid chloride mixtures.

The conditions of Example 3 were repeated except that the molar ratio of terephthalic acid chloride to 4,4'-benzophenone dicarboxylic acid chloride was changed to 20 to 80. The benzophenone dicarboxylic acid chloride was recrystallized and the amount of aromatic dicarboxylic acid chloride employed was 10% in excess of stochometric. A copolyester having an intrinsic viscosity of 1.57 dl/g and a glass transition temperature of 238° C. was obtained. In a second run under substantially the same condition a copolyester was produced having an intrinsic viscosity of 1.11 dl/g.

I claim:

1. A process for preparing polyesters comprising condensing a halide or anhydride of an aromatic dicarboxylic acid dissolved in an alkyl halide and/or aromatic hydrocarbon with a bisphenol dissolved in a mixture of an alkaline hydroxide and a polyhydroxy derivative of a liquid aliphatic hydrocarbon, ether or amine.

2. The process of claim 1 wherein the bisphenol solution is diluted with water prior to condensation.

3. The process of claim 2 wherein the bisphenol solution is diluted with about one to ten times its volume of water.

4. The process of claim 1 wherein a chloride of the aromatic dicarboxylic acid is employed.

5. The process of claim 4 wherein the aromatic dicarboxylic acid is an aromatic ring having two p-carboxyl groups or two or more aromatic rings connected in para position directly or by one or two aliphatic carbon atoms and having terminal para carboxyl groups.

6. The process of claim 5 wherein the aromatic dicarboxylic acid is a member of the group consisting of terephthalic acid and 4,4'-benzophenone dicarboxylic acid.

7. The process of claim 1 wherein the alkaline hydroxide is an alkali metal hydroxide.

8. The process of claim 7 wherein the alkali metal hydroxide is sodium hydroxide.

9. The process of claim 7 wherein the mole ratio of alkali metal hydroxide to bisphenol is in the range of about 0.1–3:1.

10. The process of claim 1 wherein the polyhydroxy derivative of an aliphatic hydrocarbon, ether or amine is a polyhydroxy alkane or its polyether.

11. The process of claim 10 wherein the polyhydroxy alkane is glycol.

12. The process of claim 1 wherein the bisphenol is an oligomer of a bisphenol condensed with a dicarboxylic acid.

13. The process of claim 1 wherein the bisphenol is an aromatic ring having two p-hydroxy groups or two or more aromatic rings para connected directly or by up to two aliphatic carbon atom linkages with terminal para hydroxy groups.

14. The process of claim 1 wherein the bisphenol is a member of the group consisting of condensates of bisphenol-A, and terephthalic acid or 4,4'benzophenone dicarboxylic acid.

15. A copolyester comprising an alternate sequence of a bisphenol oligomer having terminal phenolic hydroxy groups and an aromatic dicarboxylic acid.

16. The copolyester of claim 15 wherein the bisphenol oligomer is an oligomer prepared from bisphenol-A and terephthalic acid.

17. The copolyester of claim 15 wherein the aromatic dicarboxylic acid is 4,4'benzophenone dicarboxylic acid.

18. The copolyester as set forth in claim 15 wherein
   (a) the bisphenol oligomer is a [bisphenol-A]$_{n+1}$[terephthalic acid]$_n$ ester wherein n is an integer of 1 to 20, and
   (b) the aromatic dicarboxylic acid is 4,4'-benzophenone dicarboxylic acid.

19. A copolyester comprising an alternate sequence of a mixture of bisphenols, at least one of which is substantially insoluble in aqueous alkali metal hydroxide, and an aromatic dicarboxylic acid.

20. A copolyester comprising an alternate sequence of bisphenol-A, and a mixture of terephthalic acid and 4,4'-benzophenone dicarboxylic acid.

21. A liquid composition comprising a bisphenol dissolved in a mixture of an alkaline hydroxide and a liquid polyhydroxy derivative of an aliphatic hydrocarbon, ether or amine.

22. The liquid composition of claim 21 wherein the liquid polyhydroxy derivative is glycol.

23. The process as set forth in claim 1 wherein the condensing temperature is between about −20° C. and 80° C.

24. The process as set forth in claim 1 wherein the condensing temperature is between about 0° C. and 25° C.